(12) United States Patent
Stephan et al.

(10) Patent No.: US 11,989,037 B2
(45) Date of Patent: May 21, 2024

(54) METHOD AND CONTROLLER FOR TURN COORDINATION OF AN AIRCRAFT, AND AN AIRCRAFT WITH TURN COORDINATION

(71) Applicant: Volocopter GmbH, Bruchsal (DE)

(72) Inventors: Johannes Stephan, Stuttgart (DE); Christoph Seiferth, Stuttgart (DE); Burak Yüksel, Heidelberg (DE)

(73) Assignee: Volocopter GmbH, Bruchsal (DE)

( * ) Notice: Subject to any disclaimer, the term of this patent is extended or adjusted under 35 U.S.C. 154(b) by 408 days.

(21) Appl. No.: 17/203,091

(22) Filed: Mar. 16, 2021

(65) Prior Publication Data

US 2021/0294354 A1 Sep. 23, 2021

(30) Foreign Application Priority Data

Mar. 18, 2020 (DE) .......................... 102020107456.5

(51) Int. Cl.
 *G05D 1/00* (2006.01)
 *B64C 29/00* (2006.01)
 *B64D 27/24* (2006.01)

(52) U.S. Cl.
 CPC ......... *G05D 1/102* (2013.01); *B64C 29/0025* (2013.01); *B64D 27/24* (2013.01)

(58) Field of Classification Search
 CPC ...... G05D 1/102; G05D 1/0858; G05D 1/101; B64C 29/0025; B64C 27/08; B64C 27/12;
 (Continued)

(56) References Cited

U.S. PATENT DOCUMENTS 5,263,662 A * 11/1993 Fowler ...................... F41G 3/22
 89/41.21
6,489,898 B1* 12/2002 Nicholls ................ G01C 23/00
 340/978

(Continued)

FOREIGN PATENT DOCUMENTS

| CN | 111392047 A * | 7/2020 | ............. B64D 27/24 |
| DE | 102012202698 | 8/2013 | |
| WO | WO-2016188833 A1 * | 12/2016 | |

OTHER PUBLICATIONS

Criteria for Low-Speed Longitudinal Handling Qualities of Transport Aircraft with Closed-Loop Flight Control Systems—H.A. Moojj—Nationaaf Lucht-en Ruimtevaartfaboratorium National Aerospace Laboratory NLR (Year: 1985).*

(Continued)

*Primary Examiner* — Donald J Wallace
*Assistant Examiner* — Jalal C Coduroglu
(74) *Attorney, Agent, or Firm* — FIG. 1 Patents

(57) ABSTRACT

A method for controlling a aircraft with a plurality of drive units, in particular a plurality of electrical drive units, and a controller for flight control. At least one lateral control signal is entered into the controller for flight control in order to initiate a lateral movement of the aircraft. The significant point is that a speed (V) of the aircraft is ascertained through a speed estimation (6) and, depending on the estimated airspeed (V), a commanded roll angle ($\phi_c$) and a commanded pitch angle ($\theta_c$), a rate of turn ($\dot{\psi}$) is calculated. The lateral movement is automatically initiated with the calculated rate of turn ($\dot{\psi}$) through input of the lateral control signal.

13 Claims, 5 Drawing Sheets

(58) Field of Classification Search
CPC ......... B64C 27/57; B64C 19/00; B64D 27/24; B64D 31/06; Y02T 50/60
See application file for complete search history.

(56) References Cited

U.S. PATENT DOCUMENTS

| | | | |
|---|---|---|---|
| 10,752,372 B2 | 8/2020 | Senkel et al. | |
| 11,048,275 B1* | 6/2021 | Young | B64D 43/00 |
| 2005/0267660 A1* | 12/2005 | Fujiwara | B60W 10/20 701/41 |
| 2010/0168937 A1* | 7/2010 | Soijer | G08G 5/0052 701/11 |
| 2010/0301168 A1* | 12/2010 | Raposo | B64C 27/20 244/171.2 |
| 2010/0318336 A1* | 12/2010 | Falangas | G05B 17/02 703/8 |
| 2011/0192932 A1* | 8/2011 | Brenner | B64D 1/22 244/17.13 |
| 2012/0232718 A1 | 9/2012 | Rischmuller et al. | |
| 2013/0037658 A1* | 2/2013 | Golling | B64C 13/505 244/213 |
| 2013/0090788 A1* | 4/2013 | Christensen | G05D 1/0858 701/4 |
| 2013/0204470 A1* | 8/2013 | Luckner | G05D 1/0676 701/18 |
| 2015/0197335 A1* | 7/2015 | Dekel | B64C 27/52 701/5 |
| 2017/0160749 A1* | 6/2017 | Torralba | G01S 19/47 |
| 2017/0356925 A1* | 12/2017 | Berdoulat | B64D 43/00 |
| 2018/0018896 A1* | 1/2018 | Seehof | G05B 19/41885 |
| 2018/0088147 A1* | 3/2018 | Askarpour | G01P 5/14 |
| 2018/0170524 A1* | 6/2018 | Blanc | B64C 13/506 |
| 2018/0244369 A1 | 8/2018 | Alfred et al. | |
| 2018/0267560 A1* | 9/2018 | Zhu | G05D 1/0808 |
| 2018/0305005 A1* | 10/2018 | Parks | B64C 27/30 |
| 2018/0356437 A1* | 12/2018 | Luo | G01P 21/025 |
| 2020/0180789 A1* | 6/2020 | Li | B64D 43/02 |

OTHER PUBLICATIONS

NASA Technical Memorandum 102893—Simulation Evaluation of a Speed-Guidance Law for Harrier Approach Transitions Vernon K. Merrick, Ernesto Moralez, Michael W. Stortz, Gordon H. Hardy, and Ronald M. Gerdes. (Year: 1991).*

Final Report—Wing Articulation of Micro Air Vehicles to Reduce Gust Sensitivity Mark Costello—School of Aerospace Engineering Georgia Institute of Technology Atlanta, Georgia 30332 (Year: 2009).*

AIAA Scitech 2019 Forum—Formation Control of Fixed-Wing Unmanned Aircraft: Theory and Experiments Christopher Heintz Sean C. C. Bailey Jesse B. Hoagg Department of Mechanical Engineering The University of Kentucky Lexington, KY 40506-0503 (Year: 2019).*

* cited by examiner

METHOD AND CONTROLLER FOR TURN COORDINATION OF AN AIRCRAFT, AND AN AIRCRAFT WITH TURN COORDINATION

INCORPORATION BY REFERENCE

The following documents are incorporated herein by reference as if fully set forth: German Patent Application No. 10 2020 107 456.5, filed Mar. 18, 2020.

TECHNICAL FIELD

The invention relates to a method for controlling an aircraft, and to a controller for controlling the flight of an aircraft. The invention also relates to an aircraft that comprises a controller according to the invention.

BACKGROUND

Aircraft with a plurality of drive units are known from the prior art. Vertical takeoff and landing aircraft, also known as VTOLs, comprise in particular a plurality of drive units.

Vertical takeoff and landing aircraft with a plurality of drive units and a plurality of rotors are known here, in particular from DE 10 2012 202 698 A1.

Such an aircraft usually comprises at least one controller for flight control, for example in the form of a flight control computer, into which a control signal is entered by a pilot in order to place it into a defined flight movement. The control signal here comprises a commanded movement of the aircraft. A thrust distribution that is necessary to bring about a corresponding movement by means of the drive units, in particular of the electrical drive units, is ascertained by the controller for flight control on the basis of the control signal. Actuators such as, for example, rudders or ailerons, can also be actuated in order to implement the desired flight movement.

To maneuver the aircraft, lateral movements that lead to a change in the direction of the aircraft are inter alia required. Different types of the lateral movement differ in particular in the rate of turn of the aircraft. If the rate of turn is not equal to zero, its magnitude indicates an angular range that the aircraft flies through during a defined time unit during turning flight. If the rate of turn is zero, the lateral movement of the aircraft comprises a pure lateral translatory movement.

In known methods it is the task of the pilot to decide on the basis of the current airspeed which rate of turn is to be set, and to enter a corresponding signal for flight control into the controller.

Such a flight controller is known from US 2018/0244369 A1. It comprises an input unit in the form of a joystick that comprises a secondary input in addition to a primary input. The purpose of the primary input is to place an aircraft into a lateral movement without a rate of turn by entering a roll angle, while the purpose of the secondary input is to set a defined rate of turn for the aircraft during turning flight. The rate of turn ascertained in the prior art depends on the airspeed that has to be captured by sensors of the aircraft. The greater the airspeed, the lower is the rate of turn, and vice versa.

It is a disadvantage of previously known controllers that a plurality of inputs from the pilot are required in order to be able to carry out different types of lateral movement with the aircraft. Sensors for acquiring the airspeed are also required, on the basis of which the pilot decides what rate of turn should be set. The said sensors are, however, liable to error, and are expensive to acquire.

SUMMARY

The invention is therefore based on the object of simplifying the method for control as well as the control of aircraft, and to reduce the costs involved in the manufacture of aircraft.

This object is achieved by a method having one or more features described herein. Advantageous forms of embodiment are found below and in the claims. This object is further achieved by a controller including one or more of the features disclosed herein. Advantageous forms of embodiment of the controller according to the invention are found below and in the claims. The aircraft according to the invention also achieves the object of the invention.

In the method according to the invention for controlling an aircraft with a plurality of drive units, in particular electrical drive units, and a controller for flight control, at least one lateral control signal is entered into the controller in order to initiate a lateral movement of the aircraft.

It is significant to the method according to the invention that a speed of the aircraft is ascertained through a speed estimation and, depending on the estimated airspeed $V_{est}$ and on the lateral control signal, in particular a commanded roll angle, a rate of turn is calculated, and the lateral movement is automatically initiated with the calculated rate of turn through input of the lateral control signal.

The invention is founded in the applicant's knowledge that the estimation of the airspeed, and the automatic ascertainment and setting of a calculated rate of turn, leads to a control of the aircraft that is less subject to disturbances or malfunctions.

The invention thus differs from previously known methods in the following ways: the estimation of the airspeed takes place according to the invention without potentially faulty sensors, in particular without flow sensors such as pitot tubes or Prandtl tubes. The controller for flight control is able on the basis of the estimated airspeed to ascertain which type of lateral movement the pilot wants to bring about through the input of the lateral control signal. In particular it is not necessary for the pilot to enter two or more types of lateral control signal into the controller for flight control. Rather only one control element is necessary, with which a lateral control signal is entered into the controller for flight control, for example in the form of a commanded roll angle. The lateral control signal can also alternatively activate other actuators such as ailerons with which, for example, the roll angle can be affected.

The estimation of the speed can take place on the basis of a physical model, for example in the form of a differential equation of motion of the aircraft. The differential equation of motion is preferably based on a balance of modelled forces or torques that act at the center of gravity or on the spatially distributed structures of the aircraft. The terms of the differential equation of motion can here include the airspeed or mathematical derivatives of the airspeed. The airspeed can be estimated by solving the differential equation of motion, so that sensors with which measured values are acquired, from which the airspeed is conventionally directly ascertained, can be entirely omitted.

The solution of the differential equation of motion is preferably determined by known, numerical solution methods such as, for example, those of Euler or Runge-Kutta, which are implemented in the controller for flight control. It is within the scope of the invention that a suitable solution method has to be selected depending on the type of the differential equation of motion. It is also within the scope of the invention that algorithms for estimating the airspeed, in which the speed is estimated on the basis of artificial intelligence methods, for example in the form of synthetic neural networks, are employed.

In one advantageous embodiment of the method, the airspeed is ascertained on the basis of a commanded pitch angle, in particular depending on a drag coefficient.

The pitch angle indicates whether and to what extent the aircraft is inclined with respect to its transverse axis. Through an inclination in a pitch angle the direction of action of a total thrust of the electric drive units is however also tilted. As a result, the drive force receives a horizontal thrust component as well as a vertical thrust component. So that the aircraft does not lose height, the total thrust is adjusted such that a specific vertical thrust component acts against a weight of the aircraft.

The invention is described below in terms of flight in a horizontal plane, i.e. without a change in altitude. It is assumed here that the thrust is adjusted in such a way that the changes in the position along the z-axis are compensated for. The forces in the z-direction are balanced out in that the weight of the aircraft, which acts downwards, is compensated for by the z-component of the thrust vector (the specific vertical thrust component g).

It is of course also within the scope of the invention that the aircraft carries out a flight with a change in altitude. The equations must be adjusted with the appropriate angle for this case.

The component of the horizontal force component can be incorporated into the model of the aircraft, in particular the differential equation of motion, through trigonometric relationships to the commanded pitch angle. The estimation of the airspeed thus depends on the commanded pitch angle. The horizontal force component then corresponds to $g \tan(\theta_c)$, wherein g is the specific vertical thrust component, and $\theta_c$ is the commanded pitch angle of the aircraft.

In accordance with this advantageous development, the air drag, which acts against the flight movement of the aircraft, is taken into consideration in the speed estimation. The air drag $F^*_L$ can be expressed here through the following formula:

$$\frac{F^*_L}{m} = \frac{1}{2}\frac{\rho A c_W V^2}{m} = \bar{c}_W V^2$$

Here, $\rho$ is the density of the air, A is an effective cross-section of the aircraft viewed along an airspeed vector, $c_w$ is a drag coefficient, and V is a relative speed between the aircraft and the air along the airspeed vector. The density of the air is almost constant for small variations in flight altitude. In this case, the drag coefficient, the cross-section and the density can be combined along with the mass of the aircraft into a drag factor $\bar{c}_w$. The accuracy of the estimate is increased through the incorporation of $F_L$. If the calculation of the air drag is simplified, the following differential equation of motion can be adopted to estimate the airspeed:

$$\dot{V} = -g\tan(\theta_c) - \bar{c}_W V|V| \text{ where } -\frac{\pi}{2} < \theta_c < \frac{\pi}{2}$$

$\dot{V}$ is here an estimated flight acceleration, g is the specific vertical thrust component, $\theta_c$ the commanded pitch angle, $\bar{c}_w$ the drag factor, and V is the relative speed between the aircraft and the air along the airspeed vector.

In a further advantageous embodiment, the calculated rate of turn is zero below a first threshold speed $V_0$ for the airspeed zero, so that a translatory movement is initiated.

Investigations by the applicant have shown that maneuvers exist in the flight control which are both characterized by low air speeds and by rates of turn equal to or close to zero. A landing approach, or the maintenance of a stationary position during what is known as hovering, are examples of this. In such maneuvers, a relationship between the airspeed and the type of the desired lateral movement is advantageously specified.

In one preferred form of embodiment of the method, the aircraft executes exclusively lateral translatory movements below or at a first threshold speed $V_0$ when a commanded roll angle is entered. The first threshold speed $V_0$ can be specified for this purpose in the controller for flight control and compared during a flight with the estimated airspeed. If the estimated airspeed corresponds to or is below the first threshold speed, the rate of turn is automatically set to the value zero.

In one preferred embodiment of the method, a second threshold speed $V_{coor}$ is provided. In a range of speeds between the first threshold speed $V_0$ and the second threshold speed $V_{coor}$, the calculated rate of turn for a coordinated turning flight is adjusted depending on the first threshold speed $V_0$ and the second threshold speed $V_{coor}$ in order not to exceed a permitted rate of turn threshold of the aircraft.

The rate of turn is usually the input parameter for a flight control system. The controller is usually part of the flight control system. The pilot inputs are also usually interpreted as rates of turn by the flight control system or flight controllers. The system later translates these into a yaw rate.

If the estimated airspeed exceeds the lower threshold speed $V_0$, the number of maneuvers in which a turning flight is desired through the input of a lateral signal by the pilot rises. In contrast to the lateral translatory movement, turning flight is characterized by a curve radius. In order to perform a turning flight, a roll angle can be set at the aircraft, so that the direction of action of the total thrust of the electrical drive units, in accordance with the roll angle, has at least a component toward the inside of a curve. Transverse forces however occur during the turning flight, which can push the aircraft out of the curve if they are not countered by a turn coordination. The turn coordination can here include a reduction of the rate of turn and/or regulation of the yaw rate of the aircraft, each of which can take place depending on the commanded roll angle.

The following force balance applies to coordinated turning flight without transverse forces:

$$\dot{\psi}V = \frac{g\tan(\phi)}{\cos(\theta)}$$

Here, $\dot{\psi}$ is the rate of turn of the aircraft, V is the airspeed of the aircraft, $\theta$ is the pitch angle of the aircraft, g the specific vertical thrust component and $\phi$ is the roll angle of the aircraft.

The following law is preferably associated with the above equation in coordinated turning flight: The ascertained rate of turn of the aircraft can rise sharply at low airspeeds. Due to the physically restricted maneuverability of the aircraft, the rate of turn to be set cannot, however, be arbitrarily high, and must lie below a rate of turn threshold. The rate of turn threshold can, for example, result depending on how the coordinated turning flight of the aircraft is achieved. Provided this in some way includes the regulation of a yaw attitude of the aircraft, the rate of turn threshold can depend on a yaw rate threshold which in turn depends on the performance capacity of the drive units of the aircraft.

Exceeding the rate of turn threshold can be prevented during the turning flight in that the calculated rate of turn is reduced. This preferably takes place in the form of a coefficient or of a correction with which the rate of turn is lowered as it is calculated by the controller for flight control. The dynamic flight properties in the range of speeds between the first threshold speed $V_0$ and the second threshold speed $V_{coor}$ are thereby improved.

In one advantageous embodiment of the method, the lateral movement of the aircraft in coordinated turning flight is initiated with the calculated rate of turn when the airspeed exceeds the second threshold speed $V_{coor}$.

If the air speed exceeds the second threshold speed $V_{coor}$, the turn coordination can take place without a reduction of the rate of turn. It is advantageous here that the maneuvering of the aircraft does not have to be restricted above the first threshold speed $V_0$, since the rate of turn threshold is not exceeded. The maneuvering properties of the aircraft in turning flight thereby improve.

In one advantageous embodiment of the method, the rate of turn is calculated on the basis of the following formula:

$$\dot{\psi} = c \frac{g\tan(\phi_c)}{V\cos(\theta_c)}, c = \begin{cases} 0 & \text{if } V < V_0 \\ \frac{V - V_0}{V_{coor} - V_0} & \text{else if } V < V_{coor} \\ 1 & \text{else} \end{cases}$$

Here, $\dot{\psi}$ is the rate of turn, c is a speed-dependent control parameter, g is the specific vertical thrust component, $\phi_c$ the commanded roll angle and $\theta_c$ is the commanded pitch angle. V is the estimated airspeed, $V_0$ the first threshold speed and $V_{coor}$ the second threshold speed.

Experiments and simulation studies carried out by the applicant have shown that the specification of the first threshold speed $V_0$ and of the second threshold speed $V_{coor}$ advantageously take place depending on the individual flying properties of the aircraft. As a result, the speed ranges that result for ascertaining the rate of turn can be defined taking a reliable rate of turn, adjusted to the aircraft, into consideration. Through the specification of the threshold speeds, the speed-dependent control parameter c, which can easily be implemented and can be adjusted with only a little effort in the controller for flight control depending on differing flight properties of different aircrafts, is found in a simple manner.

In one advantageous embodiment, the calculated rate of turn is changed through offsetting with an external input, preferably through manual input by a pilot of a rate of turn correction and/or of a target value for the rate of turn.

If the ascertained rate of turn lies below the maximum permissible rate of turn, the maneuverability of the aircraft can be increased if the pilot can change the rate of turn through an external input. The change to the rate of turn through an external input can here be advantageous at every speed range of the aircraft.

The rate of turn correction here represents a value of an additional rate of turn that can be added to the rate of turn that has already been ascertained. The controller thereby ascertains a new rate of turn that it uses for adjusting a corresponding flight movement. This can comprise the change to other variables such as the yaw altitude.

In addition to the rate of turn correction, the rate of turn in coordinated turning flight can be overwritten by the target value for the rate of turn. The rate of turn that is to be set can here be made through an external input without offsetting against an already ascertained rate of turn. The target value here receives a value that can be set directly, taking the rate of turn threshold into consideration if necessary.

The present object of the invention is also achieved by a controller for the flight control of an aircraft.

The controller according to the invention for the flight control of an aircraft with a plurality of electrical drive units is, as is known per se, designed to receive at least one lateral control signal in order to introduce a lateral movement of the aircraft.

What is important is that the controller is designed to ascertain a speed of the aircraft through a speed estimation, to calculate a calculated rate of turn depending on the estimated airspeed Vest. and a commanded roll angle, and automatically to initiate the lateral movement with the calculated rate of turn through the input of the lateral control signal.

The controller according to the invention also has the above-mentioned advantages of the method according to the invention or of one of the preferred forms of embodiment of the method according to the invention.

The controller for flight control can, for example, be implemented in the form of a central flight control computer whose purpose is to receive pilot inputs and convert them into corresponding control signals with which the actuators of the aircraft are driven. It is, however, also within the scope of the invention that the flight controller is at least partially designed as a fly-by-wire system. Alternatively or in addition, the flight controller can be actively connected to non-central control units, for example in the form of an independently implemented controller or of a non-central computing unit on the ground.

In one advantageous development, a rate of turn correction and/or a target value for a rate of turn can be entered through manual input in order to change the calculated rate of turn.

The manual input of the rate of turn correction and/or of the target value for a rate of turn can both take place by means of an input element with which the lateral signals are also entered into the controller for flight control, also alternatively however via a second input element. The input can comprise a numerical input of a rate of turn that is immediately adopted by the controller for flight control for the initiation of a lateral movement. Preferably here, the controller for flight control ensures that through implementing the additional rate of turn that has been entered or the target value for the rate of turn, the maximum permissible rate of turn is not exceeded.

In another advantageous development, the controller is designed without a fluid-mechanical sensor for measuring the speed.

Known controllers for aircraft are fitted with fluid-mechanical sensors by means of which the airspeed can be ascertained. The said fluid-mechanical sensors, however, only permit an indirect ascertainment of the airspeed: Pitot tubes/Prandtl tubes in particular are prone to error, and require computational conversion of a pressure difference into an airspeed.

Through the implementation according to the invention of an estimation method for estimating the speed in the controller for flight control, sensor signals for the ascertainment of the speed can be entirely omitted.

It is, nevertheless, within the scope of the invention that the controller can be connected to other sensors. These include, for example, acceleration sensors, sensors for ambient values such as wind speed sensors, or altimeters.

The object of the invention is also achieved by a vertical takeoff and landing aircraft with a controller according to the invention as described above, or a preferred form of embodiment of a controller according to the invention.

The aircraft is preferably implemented as an electrically driven aircraft. Known electrically driven, vertical takeoff and landing aircraft, such as are described in the applicant's DE 10 2012 202 698 A1, have a greater maneuverability than conventional aircraft. The execution of pure translatory movements and a coordinated control of turning flight are, for example, possible.

The aircraft preferably comprises a plurality of electrical drive units, preferably a plurality of electrical drive units for a plurality of rotors. Particularly preferably the rotors are essentially arranged in one plane.

The aircraft is preferably designed as a man-carrying aircraft, in particular for the transport of persons, autonomously or under the control of a pilot flying with the device. The aircraft can also be designed for the transport of loads, under remote control or autonomously.

BRIEF DESCRIPTION OF THE DRAWINGS

Further preferred features and forms of embodiment of the method according to the invention and of the controller according to the invention, as well as of the aircraft according to the invention, are explained below with reference to exemplary embodiments and to the figures. The exemplary embodiments and the quoted dimensions are merely advantageous embodiments of the invention, and are not restrictive.

Here.

DETAILED DESCRIPTION

Figure 1:
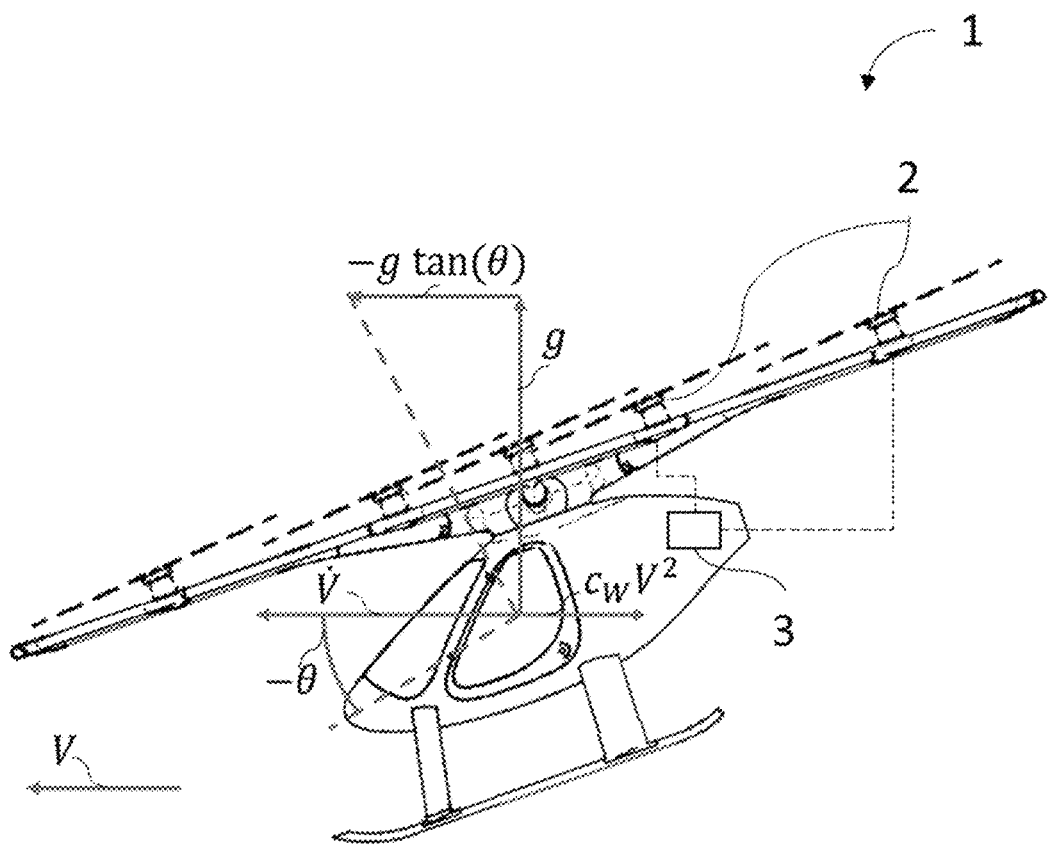
FIG. 1 shows a side view of a multicopter.

FIG. 1 shows an aircraft, in the present case a multicopter 1, with electrical drive units 2, of which, for the sake of clarity, only two are given corresponding reference signs. The multicopter 1 comprises a flight control computer (FCC) 3 that is connected for signaling with the drive units 2 and an input device (not shown).

With a commanded pilot input for maneuvering the multicopter 2 entered in the input device, the pilot input is communicated as a control signal to the FCC 3. On the basis of the control signal, the FCC 3 ascertains a thrust distribution for the drive units 2, so that the multicopter 1 performs a movement corresponding to the commanded pilot input.

To set a forward flight with a speed vector V, the pilot commands a negative pitch angle $-\theta$ to the FCC 3. By setting a corresponding thrust distribution at the drive units 2, the multicopter pitches. As a result, a total thrust generated by the drive units 2 is split in terms of its angular components into a specific vertical thrust component g and a horizontal component $-g \tan(\theta)$. The specific vertical thrust component g is aligned against a weight (not shown).

The air drag is opposed to the speed vector of the aircraft, and leads to the multicopter 1 being braked. $\bar{c}_w V^2$ is an approximation for the air drag, wherein $\bar{c}_w$ is an individual, specific, air drag coefficient, and V corresponds to the amplitude of the speed vector. By balancing the forces in the horizontal direction according to the d'Alembert principle, the following movement equation results for the multicopter:

$$\dot{V} = -g\tan(\theta_c) - \bar{c}_W V|V| \text{ where } -\frac{\pi}{2} < \theta_c < \frac{\pi}{2}$$

$\dot{V}$ here corresponds to the estimated acceleration, V to the estimated airspeed, $\bar{c}_w$ to the specific air drag coefficient, g to the specific vertical thrust component, and $\theta_c$ to the commanded pitch angle. The solution of the equation is found in the FCC 3 through a numerical solution method in order to ascertain the estimated airspeed V.

Figure 2:
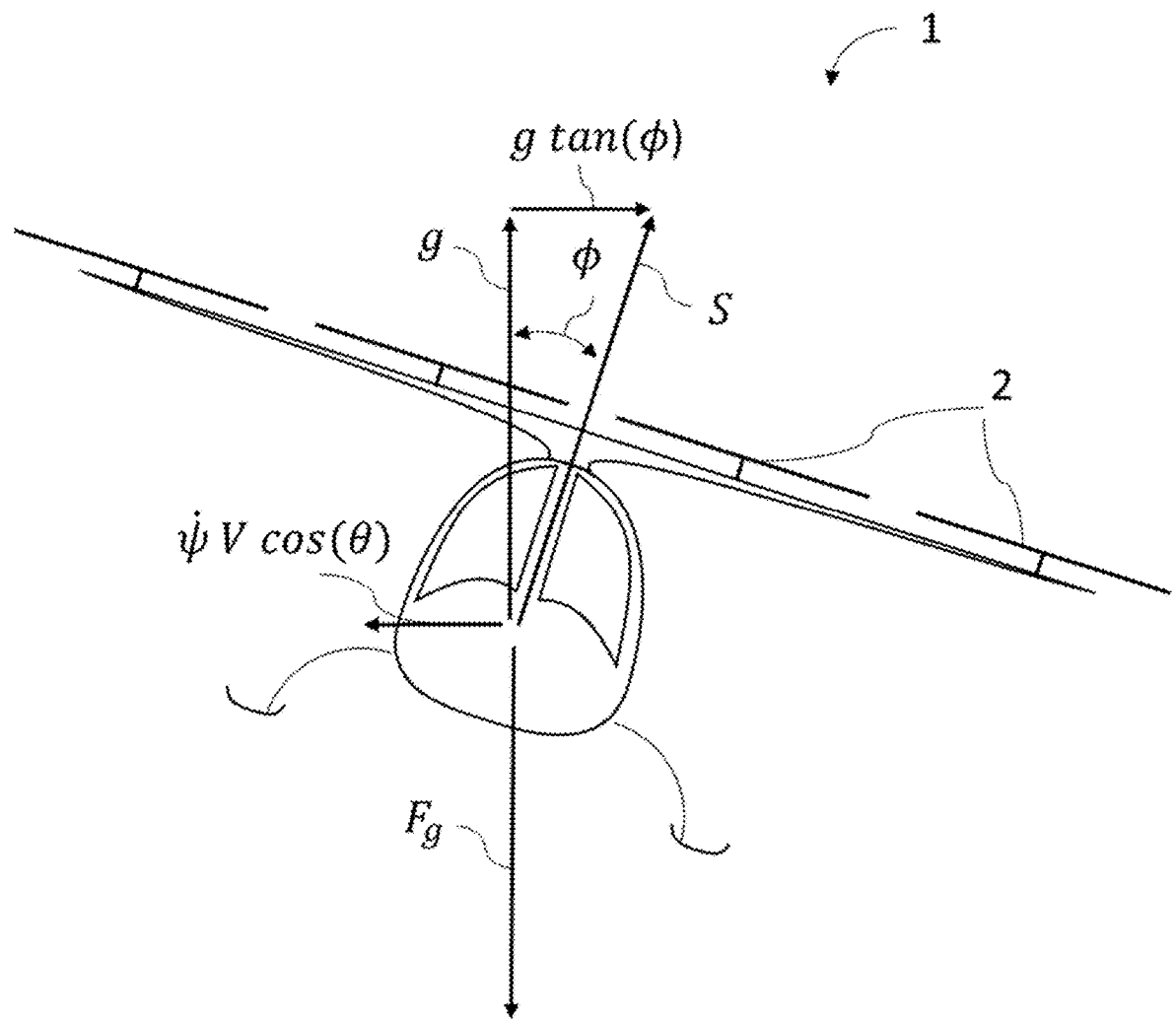
FIG. 2 shows a front view of the multicopter during the turning flight.

FIG. 2 shows the multicopter 1 viewed from the front during a turning flight. The multicopter 1 is the same one as is also shown in FIG. 1.

In order to carry out a lateral movement, a lateral signal in the form of a commanded roll angle $\phi_c$ (not shown) is entered into the FCC of the multicopter 1 by the pilot (not shown). On the basis of the commanded roll angle $\phi_c$, a shift distribution for the drive units 2 is ascertained in the FCC, through which the actual roll angle $\phi$ of the multicopter 1 is changed, and thereby also the direction along which a specific total thrust $S=g/\cos(\phi)/\cos(\theta)$ of the multicopter 1 acts. Taking the vertical thrust component into account, the horizontal component of the total thrust S is then $g \tan(\phi)/\cos(\theta)$.

The centrifugal force $\dot{\psi}V$ is opposed to the horizontal component $g \tan(\phi)/\cos(\theta)$. $\dot{\psi}$ here is the rate of turn of the multicopter 1 when flying the curve through an angle of turn $\psi$.

The following equation, which describes the force relationship in coordinated turning flight, results from balancing the forces in the horizontal direction.

$$\dot{\psi}V = \frac{g\tan(\phi)}{\cos(\theta)}$$

Figure 3:
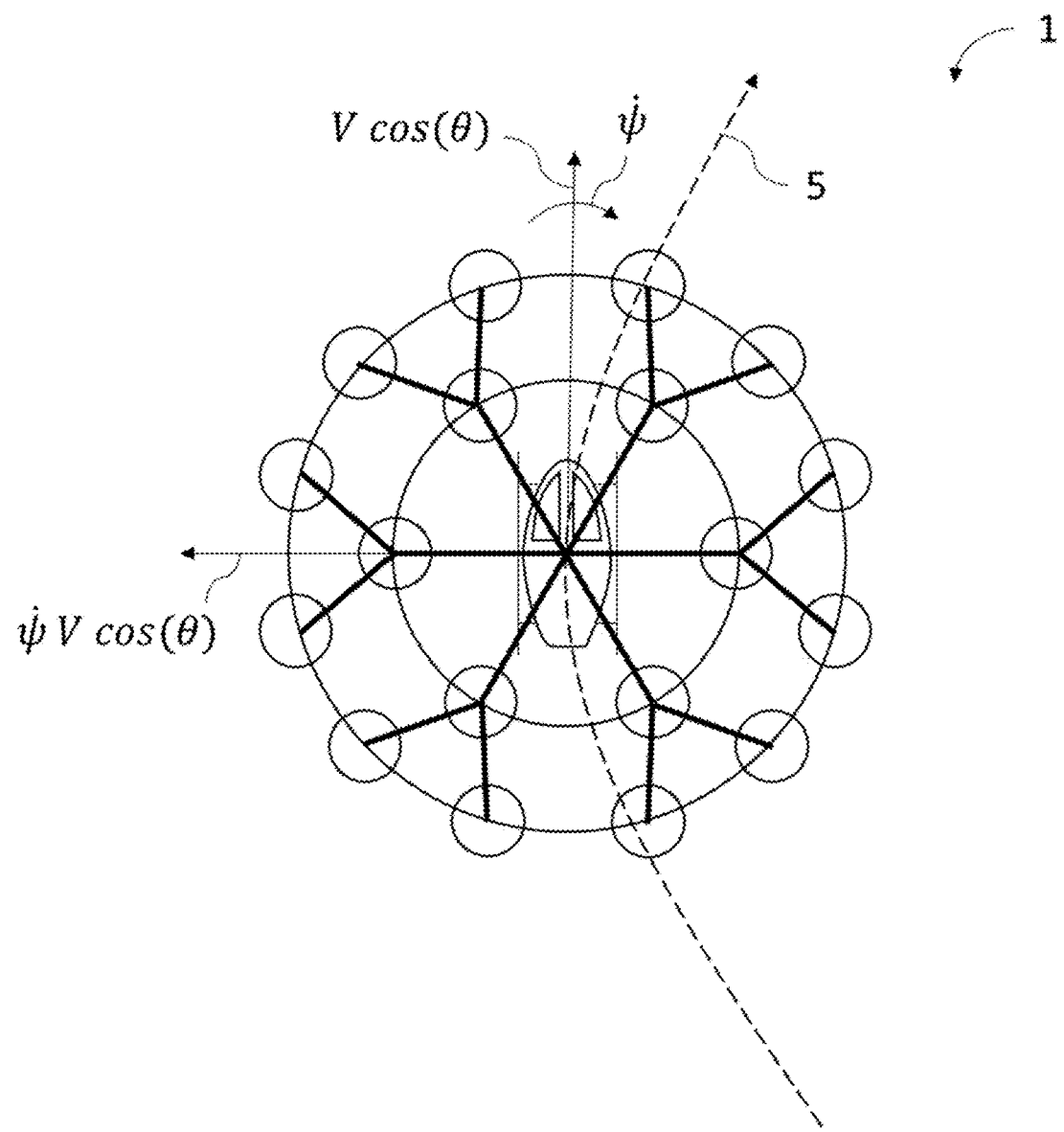
FIG. 3 shows a plan view of the multicopter during a turning flight.

FIG. 3 shows a plan view of the multicopter 1 during a turning flight. The multicopter 1 is the same one as is also shown in FIGS. 1 and 2.

A curved path 5 is flown along by adjusting a roll angle in accordance with FIG. 2. A part of an angle $\psi$ is passed through here by the multicopter 1, wherein the movement of the multicopter 1 is described by the rate of turn $\dot{\psi}$. The centrifugal force $\dot{\psi} V$ results from the rate of turn $\dot{\psi}$ and from the speed V, which is oriented tangentially to the flight curve 5.

A known effect during turning flight is known as slipping, wherein the multicopter 1 is pushed out of the flight curve 5. Slipping arises as a result of transverse forces which, in the illustrated exemplary embodiment, are compensated for through an appropriate control of the drive units of the multicopter 1. In the multicopter 1 shown, the regulation takes place through adjusting the rate of turn of the aircraft. This cannot, however, be changed arbitrarily, since the multicopter 1 has a rate of turn threshold. This maximum permissible rate of turn is stored as a threshold value in the FCC and is taken into account during flight when adjusting permissible orientations of the multicopter.

If equation $$\dot{\psi} V = \frac{g \tan(\phi)}{\cos(\theta)}$$

is rearranged for $\dot{\psi}$, it will be seen that the rate of turn $\dot{\psi}$ at low airspeeds V rises correspondingly, and during slow turning flights therefore cannot necessarily always be readjusted quickly enough taking the rate of turn threshold into account. Threshold values are therefore stored in the FCC of the multicopter 1, with which the coordination of the turning flight takes place giving consideration to the airspeed.

The calculation of the rate of turn $\dot{\psi}_{coor}$ takes place on this basis with:

$$\dot{\psi} = c \frac{g \tan(\phi_c)}{V \cos(\theta_c)}, \; c = \begin{cases} 0 & \text{if } V < V_0 \\ \frac{V - V_0}{V_{coor} - V_0} & \text{else if } V < V_{coor} \\ 1 & \text{else} \end{cases}$$

$V_0$ here is a lower first threshold speed, below which the aircraft does not carry out a turning movement, but a purely lateral translational movement. In the calculation of the rate of turn, this is reflected by the coefficient c, which is set to zero when the speed falls below the first threshold speed, as stated. $V_{coor}$ is an upper second threshold speed.

If the estimated airspeed $V_{est}$ lies between the first threshold speed $V_0$ and the second threshold speed $V_{coor}$, the required rate of turn in the coordinated turning flight $\dot{\psi}$ is calculated in such a way that the maximum permissible rate of turn threshold is not exceeded. The difference between the estimated airspeed $V_{est}$ and the first threshold speed $V_0$ is set in relation to the difference between the second threshold speed $V_{coor}$ and the first threshold speed $V_0$ to calculate the coefficient c. As a result, the rate of turn $\dot{\psi}$ is reduced in such a way that the rate of turn threshold, and thereby a yaw rate threshold that may correspond to it, is not exceeded. The magnitudes of the first threshold speed $V_0$ and the second threshold speed $V_{coor}$ are ascertained for the multicopter through experiment and simulation.

If, however, a rate of turn is calculated during the turning flight at which the rate of turn lies below the permissible rate of turn threshold, it is possible to offset the ascertained rate of turn with a directional pilot specification $\dot{\psi}_c$. The reference variable resulting from this is $\dot{\psi}_{des} = \dot{\psi}_c + \dot{\psi}$.

Figure 4:
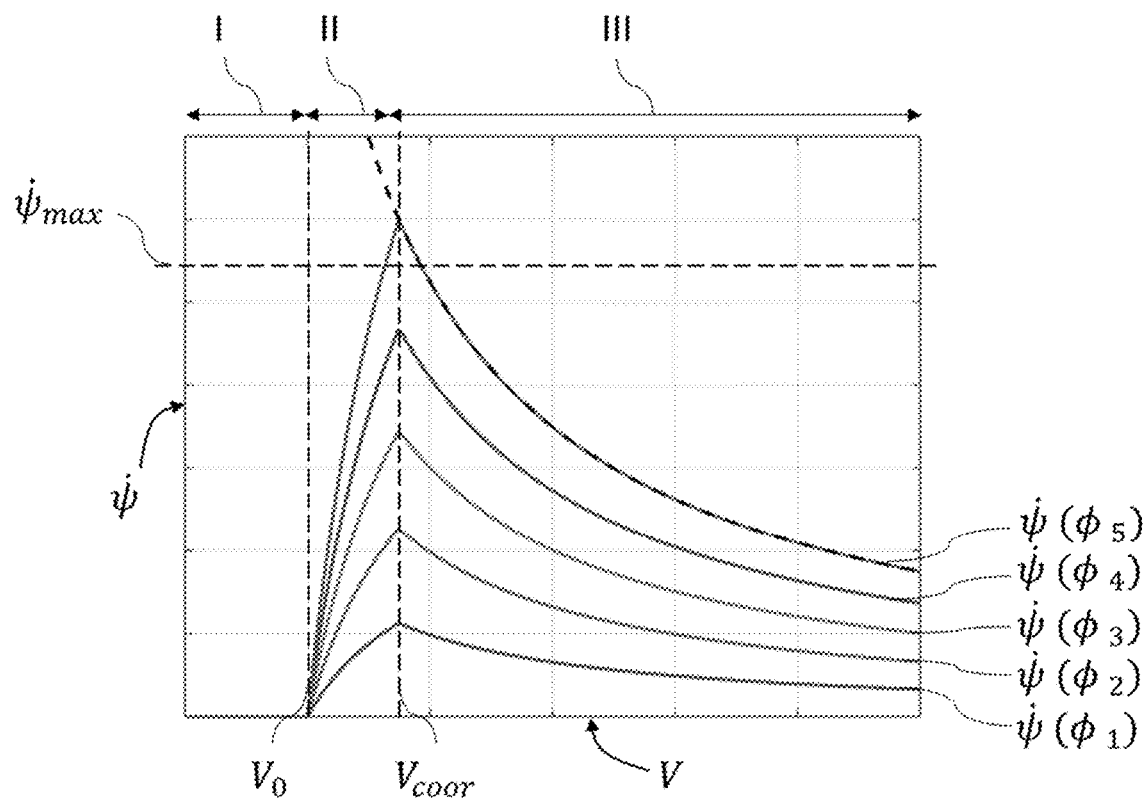
FIG. 4 shows a graph of the curve of a calculated rate of turn depending on an estimated airspeed and a roll angle of the aircraft.

The way in which the coordination of the flight is realized depending on the airspeed V is shown with reference to a graph according to FIG. 4.

The estimated airspeed V is plotted on the horizontal axis of the illustrated graph, while the vertical axis indicates the rate of turn $\dot{\psi}$ to be ascertained. The first threshold speed $V_0$ and the second threshold speed $V_{coor}$ divide the region of the horizontal axis into a first speed region I, a second speed region II and a third speed region III.

If one of five exemplary roll angles $\phi_{1'}, \phi_{2'}, \phi_{3'}, \phi_{4'}, \phi_{5}$ is commanded for a turning flight, where $\phi_1 < \phi_2 < \phi_3 < \phi_4 < \phi_5$ applies, then the equation $$\dot{\psi} = c \frac{g \tan(\phi_c)}{V \cos(\theta_c)}, \; c = \begin{cases} 0 & \text{if } V < V_0 \\ \frac{V - V_0}{V_{coor} - V_0} & \text{else if } V < V_{coor} \\ 1 & \text{else} \end{cases}$$

yields the automatically calculated rate of turn $\dot{\psi}$, which is used both for a pure translatory movement as well as for a coordinated turning flight. If the calculated rate of turn $\dot{\psi}_{coor}$ lies below a maximum rate of turn threshold $\dot{\psi}_{max}$, at which the rate of turn threshold of the aircraft is not exceeded, the rate of turn can be increased by changing the roll angle, in that the roll angle is increased, for example, from $\phi_1$ to $\phi_2$.

Figure 5:
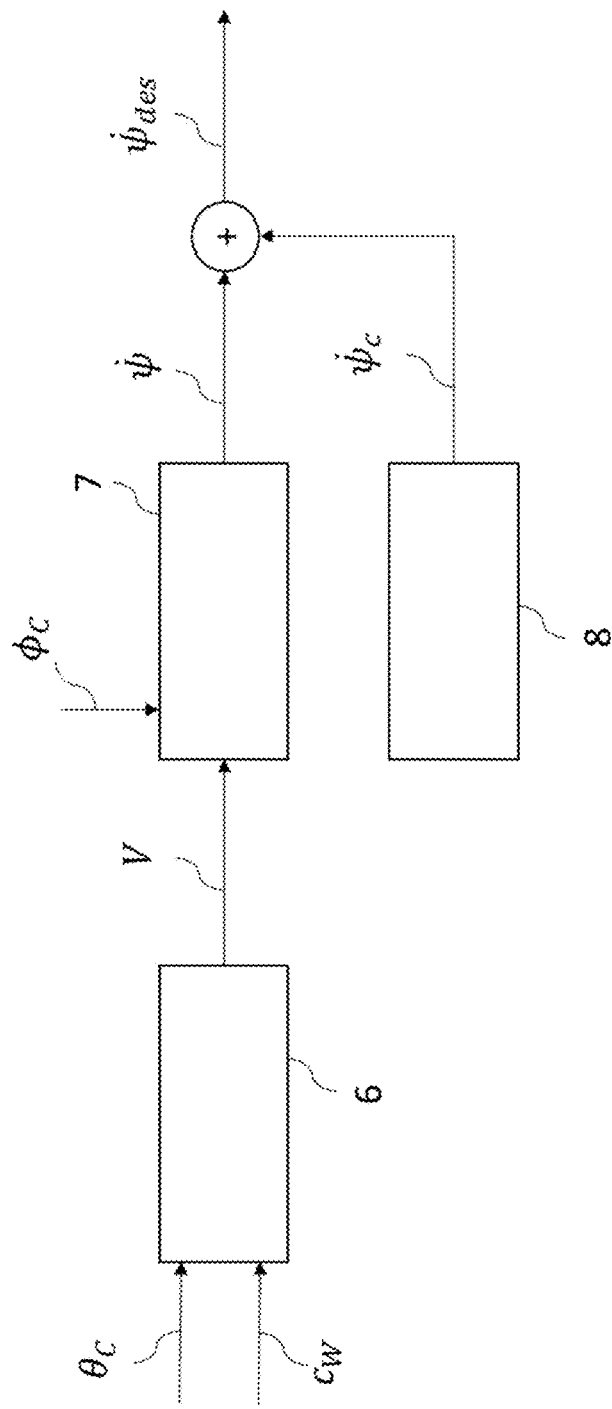
FIG. 5 shows a flow diagram for performing the method for lateral control of the aircraft.

FIG. 5 shows an exemplary embodiment of a schematic method flow for lateral control of the aircraft, according to which the controller is implemented in the FCC of the multicopter according to FIGS. 1-3. The exemplary embodiment shown contains a speed estimation 6 that is obtained on the basis of the solution to the differential equation of motion $$\dot{V} = -g \tan(\theta_c) - \bar{c}_W V |V| \text{ where } -\frac{\pi}{2} < \theta_c < \frac{\pi}{2}.$$

The speed is ascertained for this purpose on the basis of the air drag coefficient $\bar{c}_w$ and the commanded pitch angle $\theta_c$. The estimated airspeed V resulting from this is used to calculate the rate of turn in a rate of turn calculation 7 that corresponds to the description of FIG. 4. A rate of turn $\dot{\psi}$, which can be adjusted by a directional input $\dot{\psi}_c$ of a pilot 8, is yielded by this. An overwritten rate of turn $\dot{\psi}_{des}$, with which the multicopter is controlled, is found as a result.

The invention claimed is:

1. A method for controlling an aircraft (1) with a plurality of drive units (2) and a controller for flight control (3), the method comprising:
   entering at least one lateral control signal into the controller (3) in order to initiate a lateral movement of the aircraft (1);
   ascertaining a speed of the aircraft through an airspeed estimation (6) based on a commanded pitch angle ($\theta_C$) and in dependence on a drag coefficient ($\bar{c}_W, c_w$);
   depending on the estimated airspeed (V) and a commanded roll angle ($\phi_C$), calculating a rate of turn ($\dot{\psi}$); and
   automatically initiating the lateral movement with the calculated rate of turn ($\dot{\psi}$) through input of the at least one lateral control signal, wherein the calculated rate of turn ($\dot{\psi}$) is zero below a first threshold speed ($V_0$) for the airspeed (V), so that an exclusively translatory movement is initiated.

2. The method as claimed in claim 1, further comprising, at the airspeed (V) between the first threshold speed ($V_0$) and a second threshold speed (Vcoor), ascertaining a reduced rate of turn ($\dot{\psi}$) for a coordinated turning flight depending on the first threshold speed ($V_0$) and the second threshold speed (Vcoor) in order not to exceed a permitted rate of turn threshold of the aircraft.

3. The method as claimed in claim 2, further comprising initiating the lateral movement of the aircraft in coordinated turning flight with the calculated rate of turn ($\dot{\psi}$) when the airspeed (V) exceeds the second threshold speed (Vcoor).

4. The method as claimed in claim 2, wherein the calculated rate of turn ($\dot{\psi}$) is calculated based on the following formula $$\dot{\psi} = c\frac{g\tan(\phi_c)}{V\cos(\theta_c)}, c = \begin{cases} 0 & \text{if } V < V_0 \\ \frac{V - V_0}{V_{coor} - V_0} & \text{else if } V < V_{coor} \\ 1 & \text{else} \end{cases}$$

wherein $\theta_c$ is a commanded pitch angle, $\phi_c$ is the commanded roll angle, g is a specific vertical thrust force, and c is a rate of turn coefficient that is ascertained depending on the estimated airspeed V.

5. The method as claimed claim 1, further comprising changing the calculated rate of turn through offsetting with an external input ($\dot{\psi}_c$).

6. The method as claimed claim 5, wherein the external input ($\dot{\psi}_c$) is at least one of a manual input by a pilot (8) of a rate of turn correction or a target value for the rate of turn.

7. A controller (3) for the flight control of an aircraft (1) with a plurality of drive units (2), the controller (3) being configured to receive at least one lateral control signal in order to initiate a lateral movement of the aircraft (1), and the controller (3) being further configured to ascertain a speed (V) of the aircraft through a speed estimation based on a commanded pitch angle ($\theta_C$) and in dependence on a drag coefficient ($\bar{c}_W$, $c_w$), to calculate a calculated rate of turn ($\dot{\psi}$) depending on the estimated airspeed (V) and a commanded roll angle ($\phi_C$), and to automatically initiate the lateral movement with the ascertained, calculated rate of turn through the input of the lateral control signal, wherein the calculated rate of turn ($\dot{\gamma}$) is zero below a first threshold speed ($V_0$) for the airspeed (V), so that an exclusively translatory movement is initiated.

8. The controller as claimed in claim 7, wherein the controller is configured such that at least one of a rate of turn correction and/or a target value for the rate of turn ($\dot{\psi}_c$) is enterable through manual input in order to change the calculated rate of turn ($\dot{\psi}$).

9. The controller as claimed in claim 7, wherein the controller (3) is configured without sensors for measuring the speed.

10. A vertical takeoff and landing aircraft (1), comprising a controller as claimed in claim 7.

11. The vertical takeoff and landing aircraft (1) of claim 10, further comprising a plurality of electrical drive units.

12. The vertical takeoff and landing aircraft (1) of claim 11, wherein the plurality of electrical drive units are connected to a plurality of rotors.

13. The vertical takeoff and landing aircraft (1) of claim 12, wherein the rotors are essentially arranged in one plane.

* * * * *